United States Patent
Rudolf et al.

(10) Patent No.: US 11,187,018 B2
(45) Date of Patent: Nov. 30, 2021

(54) RESETTABLE LOCKING SYSTEM FOR A DOOR HANDLE ASSEMBLY

(71) Applicant: Illinois Tool Works Inc., Glenview, IL (US)

(72) Inventors: Andreas Rudolf, Wurzburg (DE); Zsolt Wilke, Bad Mergentheim (DE)

(73) Assignee: Illinois Tool Works Inc., Glenview, IL (US)

( * ) Notice: Subject to any disclaimer, the term of this patent is extended or adjusted under 35 U.S.C. 154(b) by 771 days.

(21) Appl. No.: 15/959,893

(22) Filed: Apr. 23, 2018

(65) Prior Publication Data

US 2018/0320421 A1 Nov. 8, 2018

Related U.S. Application Data

(60) Provisional application No. 62/503,025, filed on May 8, 2017.

(51) Int. Cl.
| | |
|---|---|
| *E05B 85/18* | (2014.01) |
| *E05B 77/06* | (2014.01) |
| *E05B 85/16* | (2014.01) |
| *B60J 5/04* | (2006.01) |

(52) U.S. Cl.
CPC ............ *E05B 85/18* (2013.01); *E05B 77/06* (2013.01); *E05B 85/16* (2013.01); *B60J 5/0468* (2013.01)

(58) Field of Classification Search
CPC ..... Y10T 292/57; Y10T 292/85; Y10T 16/44; Y10T 292/82; Y10T 292/88; Y10T 70/7751; Y10T 74/20732; Y10T 16/459; Y10T 16/473; Y10T 292/14; E05B 85/12; E05B 85/16; E05B 1/0038; E05B 85/13; E05B 13/101; E05B 85/10; Y10S 292/27; Y10S 292/31; Y10S 16/30; Y10S 292/30
See application file for complete search history.

(56) References Cited

U.S. PATENT DOCUMENTS

| | | | | |
|---|---|---|---|---|
| 3,476,430 | A * | 11/1969 | Widmer | E05B 77/06 292/336.3 |
| 6,193,301 | B1 * | 2/2001 | Baumeier | B60J 7/1851 292/DIG. 4 |
| 6,471,262 | B1 * | 10/2002 | Schwab | E05B 77/06 242/384.6 |
| 7,284,776 | B2 * | 10/2007 | Cummins | E05B 77/04 292/336.3 |

(Continued)

FOREIGN PATENT DOCUMENTS

| | | |
|---|---|---|
| CN | 101736961 A | 6/2010 |
| CN | 110073070 A | 7/2019 |

(Continued)

OTHER PUBLICATIONS

Extended European Search Report for EP 18169585.9-1005, dated Sep. 28, 2018.

(Continued)

*Primary Examiner* — Mark A Williams
(74) *Attorney, Agent, or Firm* — Quarles & Brady LLP

(57) ABSTRACT

A door handle assembly for a door of a vehicle includes a housing that is configured to form part of or otherwise connect to the door, and a handle moveably coupled to the housing. The handle includes a spherical member that is configured to move between a rest position and a blocking position.

20 Claims, 4 Drawing Sheets

(56) References Cited

U.S. PATENT DOCUMENTS

| | | | | |
|---|---|---|---|---|
| 2010/0171326 A1* | 7/2010 | Bacon | ............... | E05B 47/0673 |
| | | | | 292/336.3 |
| 2016/0053519 A1* | 2/2016 | Och | ............... | E05B 85/16 |
| | | | | 292/336.3 |
| 2017/0107744 A1* | 4/2017 | Wilke | ............... | E05B 17/0004 |
| 2018/0195320 A1* | 7/2018 | Cousin | ............... | E05B 81/04 |
| 2018/0320421 A1* | 11/2018 | Rudolf | ............... | E05B 77/06 |
| 2019/0264473 A1* | 8/2019 | Wilke | ............... | E05B 81/00 |

FOREIGN PATENT DOCUMENTS

| | | |
|---|---|---|
| DE | 19756344 | 6/1999 |
| EP | 1109980 | 6/2001 |
| WO | 0043617 A3 | 7/2000 |
| WO | WO 2015/187245 | 12/2015 |
| WO | WO 2018/118281 | 6/2018 |

OTHER PUBLICATIONS

First Office Action from corresponding Chinese Patent Application No. 201810424817.X, dated Sep. 17, 2020 (16 pages).

\* cited by examiner

RESETTABLE LOCKING SYSTEM FOR A DOOR HANDLE ASSEMBLY

RELATED APPLICATIONS

This application relates to and claims priority benefits from U.S. Provisional Patent Application No. 62/503,025, entitled "Resettable Locking System for a Door Handle Assembly," filed May 8, 2017, which is hereby incorporated by reference in its entirety.

FIELD OF EMBODIMENTS OF THE DISCLOSURE

Embodiments of the present disclosure generally relate to a door handle assembly, which may be used within a vehicle, and, more particularly, to a resettable locking system for a door handle assembly.

BACKGROUND

Various vehicles include doors that are configured to be opened to allow individuals to enter and exit an internal cabin or cockpit. For example, automobiles typically include doors on either side. Each door includes a door handle assembly that is configured to be grasped and manipulated by an individual to open the door.

FIG. 1 illustrates a cross-sectional view of a known door handle assembly 10. The external door handle assembly 10 includes a grab section 11 that is configured to be manually actuated from outside of a door 13 of a vehicle. The grab section 11 connects to an actuating lever 12. The actuating lever 12 is pivotally mounted about an axis 14 on a bearing component. As shown in FIG. 1, the grab section 11 is in a rest (or at-rest) position.

When the grab section 11 is manually pulled away from the door 13, the grab section 11 pivots together with the actuating lever 12 clockwise about the axis 14, such that the portion 12' of the actuating lever 12 upwardly moves. The actuating lever 12 is coupled to a door lock, so that the door lock in the opening position of the grab section 11 and/or the actuating lever 12 is unlocked and the door 13 is able to be opened.

A housing 16 (such as within the door 13) forms a bearing section including a pathway 18. A metal ball 20 is retained within the pathway 18 of the housing 16. The metal ball 20 is biased by a helical spring 21 into a releasing position, as shown in FIG. 1. In the releasing position, the portion 12' of the actuating lever 12 is able to move unhindered out of the resting position shown and upwardly into the opening position.

If, for example, due to a side impact, a transverse acceleration in FIG. 1 occurs from top to bottom, the metal ball 20 runs upwardly along the pathway 18, driven by the inertial force, compressing the helical spring 21. It may be seen that the base of the pathway 18 is inclined such that the distance between the metal ball 20 and a locking surface 22 of the actuating lever 12 facing the metal ball 20 diminishes with a movement of the metal ball 20 from its resting position shown in FIG. 1 upwardly into a locking position. In particular, the metal ball 20 in its locking position presses against the locking surface 22 of the actuating lever 12 such that the grab section 11 is locked against a movement into its opening position.

Typically, a handle is connected to a returning spring that pulls the handle into an initial position. A user may push the handle from outside to return it to the initial position.

As explained, a known door handle assembly includes a metal ball that is mounted within a housing of and/or within a door. During a crash, for example, a free moving lock may not return to an at-rest position. Instead, the handle may be stuck in an extended position when subjected to an external force, such as during a crash.

In general, a door handle assembly may be less susceptible to sticking in an extended position, such as in a blocking state. While the handle may return to the initial position, a blocking feature may not return to an initial position, thereby rendering a latch inoperable.

SUMMARY OF EMBODIMENTS OF THE DISCLOSURE

A need exists for a door handle assembly that is less susceptible to sticking in an extended position, such as in a blocking state. Further, a need exists for a door handle assembly that may be easily returned to an at-rest position. Moreover, a need exists for a door handle assembly that is configured to return to an at-rest position even after being subjected to an external force.

With those needs in mind, certain embodiments of the present a door handle assembly for a door of a vehicle. The door handle assembly includes a housing that is configured to form part of or otherwise connect to the door, a handle moveably coupled to the housing, and a spherical member coupled to the handle. The spherical member is configured to move between a rest position and a blocking position. In at least one embodiment, the handle includes the spherical member. The spherical member may be a metal ball.

In at least one embodiment, the handle includes a retainer that retains the spherical member. The retainer includes a retaining chamber. The spherical member is configured to move within the retaining chamber between the rest position and the blocking position. The blocking position may be at a lower position within the retaining chamber than the rest position.

In at least one embodiment, the retainer includes a plurality of prongs defining the retaining chamber therebetween. Each of the plurality of prongs may include an extension beam and a retaining clip. The retaining clips of at least two of the plurality of prongs may be at different positions along the extension beams.

The housing may include a blocking protuberance. The spherical member in the blocking position abuts against the blocking protuberance to halt motion of the handle relative to the housing. The blocking protuberance forces the spherical member from the blocking position back into the rest position in response to the handle being outwardly pulled.

Figure 1:
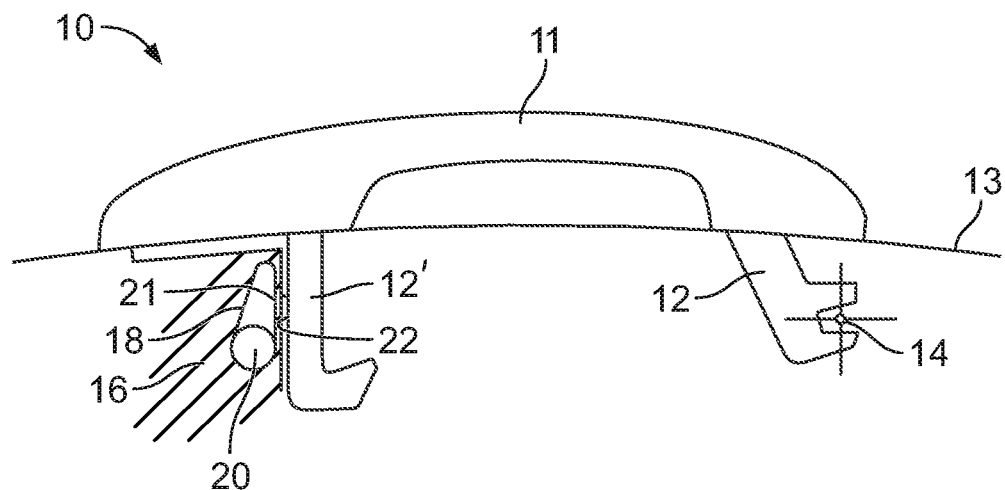
FIG. 1 illustrates a cross-sectional view of a known door handle assembly.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS
OF THE DISCLOSURE

United States Patent Application Publication No. 2016/0053519, entitled "Door Handle Assembly for an Automobile" is hereby incorporated by reference in its entirety.

Embodiments of the present disclosure provide an inertial locking system for a door handle assembly. The door handle assembly may be an interior door handle assembly (such as facing an internal cabin of a vehicle), or an external door handle assembly (such as extending from an exterior door surface of the vehicle). The inertial locking system includes a spherical member, such as a metal ball, that is secured within a rotatable handle, as opposed to a fixed portion of a housing. The handle includes a retainer having a guiding feature (such as a retainer) that is configured to guide the ball between a rest position (for example, an at-rest position) and a blocking position during an impact, for example. Because the spherical member is in the moving part (that is, the handle), the spherical member provides a counterweight when the handle is in the rest position. The spherical ball is configured to prevent, minimize, or otherwise reduce an unintended latching during an impact, such as a crash.

In at least one embodiment, the blocking structure is configured to force the ball back into an initial, rest position (such as via a higher exerted force than during an impact event). As such, the handle assembly may be reversible and reusable. In the blocking position, the spherical member abuts against a blocking structure and stops the moving part before affecting the latch. In the rest position, the spherical member passes the blocking structure and the moving part is fully moveable.

Figure 2:
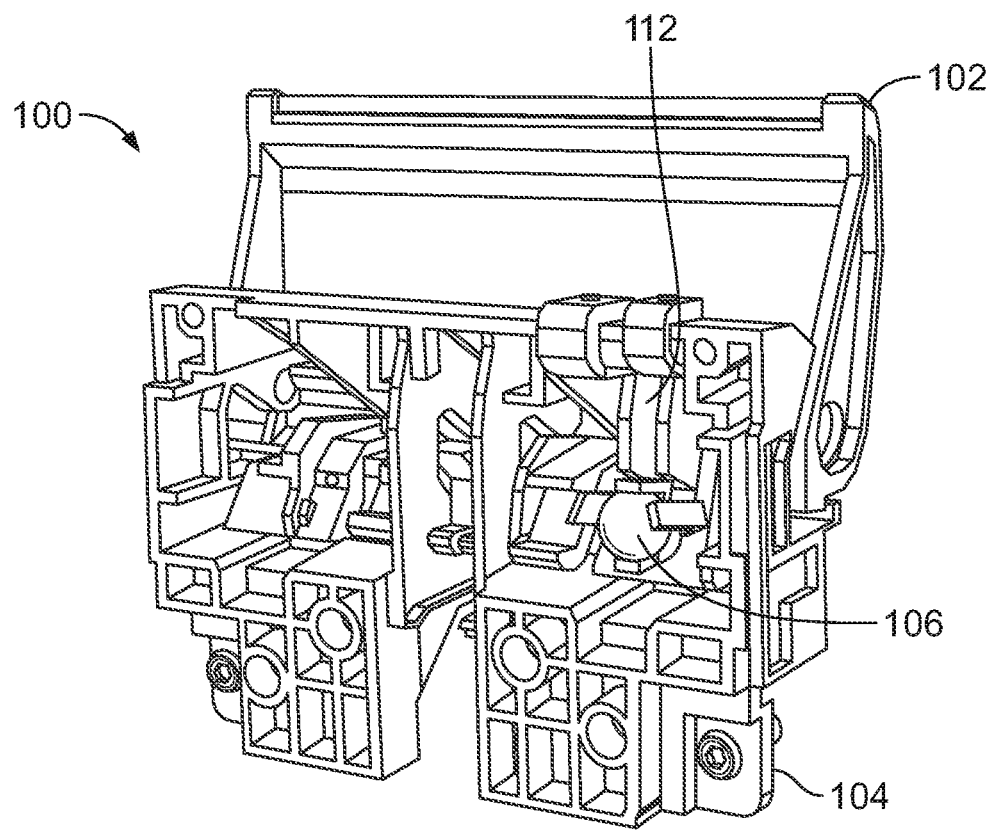
FIG. 2 illustrates a perspective rear view of a handle assembly, according to an embodiment of the present disclosure.

FIG. 2 illustrates a perspective rear view of a handle assembly 100, according to an embodiment of the present disclosure. It is to be understood that the handle assembly 100 shown in FIG. 2 is merely an example, and not limiting. The handle assembly 100 may be an interior handle assembly, or an exterior handle assembly. The handle assembly 100 includes a handle 102 moveably coupled to a housing 104. The housing 104 may be secured to and/or part of a door, such as the door 13 shown in FIG. 1.

The handle 102 includes a spherical member 106, such as a metal (for example, steel or aluminum) ball. That is, the spherical member 106 is retained within a portion of the handle 102, and not the housing 104. In at least one embodiment, such as when the handle assembly 100 is an exterior handle, the spherical member 106 may be contained within an intermediate structure between the handle 102 and another component, such as a Bowden cable. That is, the spherical member 106 may be coupled to the handle 102 through the intermediate structure, or directly coupled to a portion of the handle 102 (for example, the handle 102 may include the spherical member 106).

Figure 3:
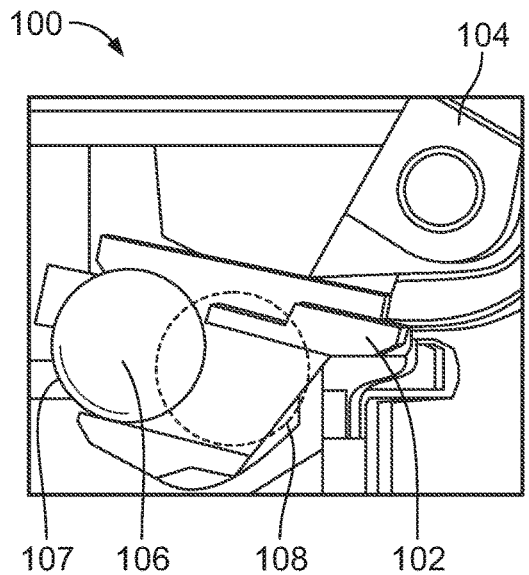
FIG. 3 illustrates a cross-sectional view of a spherical member in a rest position retained within a handle of a handle assembly, according to an embodiment of the present disclosure.

FIG. 3 illustrates a cross-sectional view of the spherical member 106 in a rest position 107 retained within the handle 102 of the handle assembly 100, according to an embodiment of the present disclosure. A blocking position 108 is shown as a dashed circle.

Figure 4:
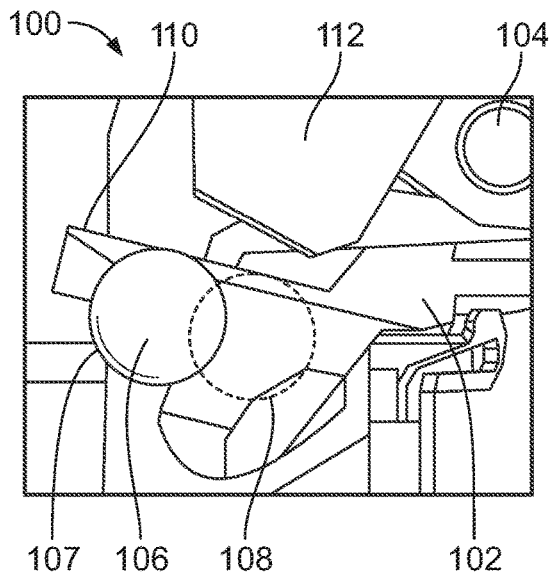
FIG. 4 illustrates a cross-sectional view of a guide member that guides a spherical member retained within a handle of a handle assembly, according to an embodiment of the present disclosure.

FIG. 4 illustrates a cross-sectional view of a guide member 110 (such as a retainer, as described herein) that guides the spherical member 106 retained within the handle 102 of the handle assembly 100, according to an embodiment of the present disclosure. The guide member 110 may be one or more prongs, beams, tubes, sleeves, and/or the like having a channel, track, chamber, and/or the like that guides the spherical member 106 into a retained position within the handle 102. The guide member 110 guides the spherical member 106 between the rest position and the blocking position 108.

The blocking protuberance 112 may be one or more ribs, beams, posts, brackets, or the like extending inwardly from the housing 104 towards the handle 102. When the spherical member 106 is moved into the blocking position 108, the spherical member 106 interferes with (for example, abuts against) a blocking protuberance 112 (also shown in FIG. 2) of the housing 104. The spherical member 106 in the blocking position 108 abuts against the blocking protuberance 112 to halt motion of the handle 102 relative to the housing 104. When the spherical member 106 is moved into the blocking position 108 and abuts against the blocking protuberance 112, the handle 102 is prevented from latching in relation to the housing 104.

Figure 5:
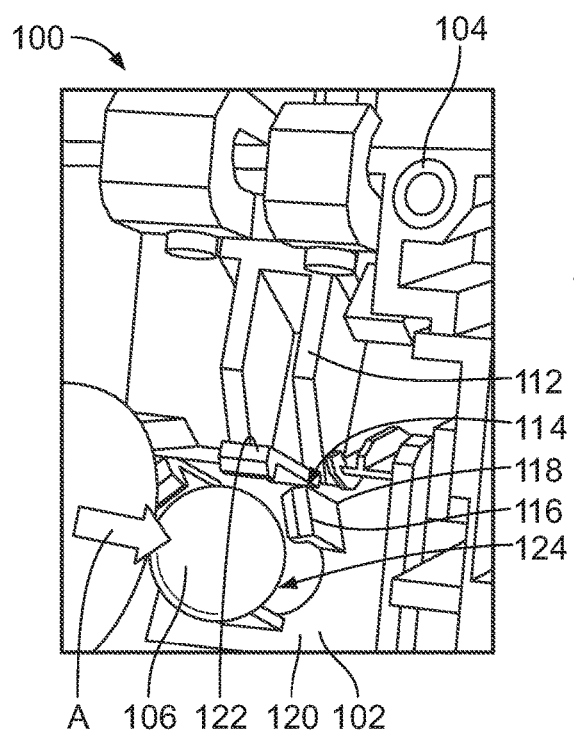
FIG. 5 illustrates a perspective view of a spherical member being inserted into a retainer formed in a handle of a handle assembly, according to an embodiment of the present disclosure.
Figure 6:
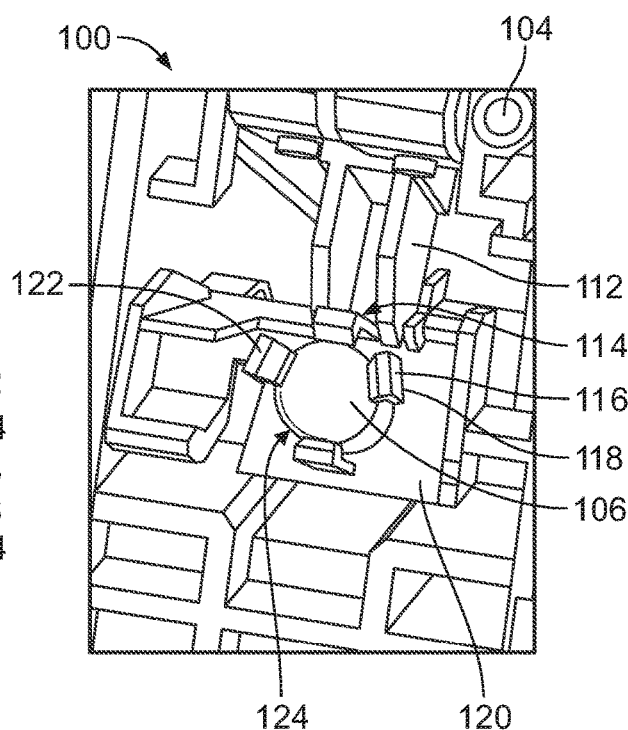
FIG. 6 illustrates a perspective view of a spherical member secured within a retainer formed in a handle of a handle assembly, according to an embodiment of the present disclosure.

FIG. 5 illustrates a perspective view of the spherical member 106 being inserted into a retainer 114 formed in the handle 102 of the handle assembly 100, according to an embodiment of the present disclosure. FIG. 6 illustrates a perspective view of the spherical member 106 secured within the retainer 114 formed in the handle 102 of the handle assembly 100. Referring to FIGS. 5 and 6, in at least one embodiment, the retainer 114 includes a plurality (for example, four) prongs 116. Each prong 116 includes an extension beam 118 extending from an interior base 120 of the handle 102. A retaining clip 122 (such an inwardly-directed ramp) extends from a portion end of the extension beam 118. For example, one or more retaining clips 122 may be at distal ends of the extension beams 118, while one or more other retaining clips 122 may be positioned below the distal ends of the extension beams 118. The prongs 116 define a guiding or retaining chamber 124 therebetween.

As the spherical member 106 is pressed into the retaining chamber 124 in the direction of arrow A between the prongs 116, the prongs 116 outwardly deflect. As the spherical member 106 passes fully into the retaining chamber 124, and the prongs inwardly deflect back to at-rest positions, the spherical member 106 is trapped between the extension beams 118 and underneath the retaining clips 122. As such, the spherical member 106 may be snapably secured within the retainer 114 of the handle 102.

Figure 7:
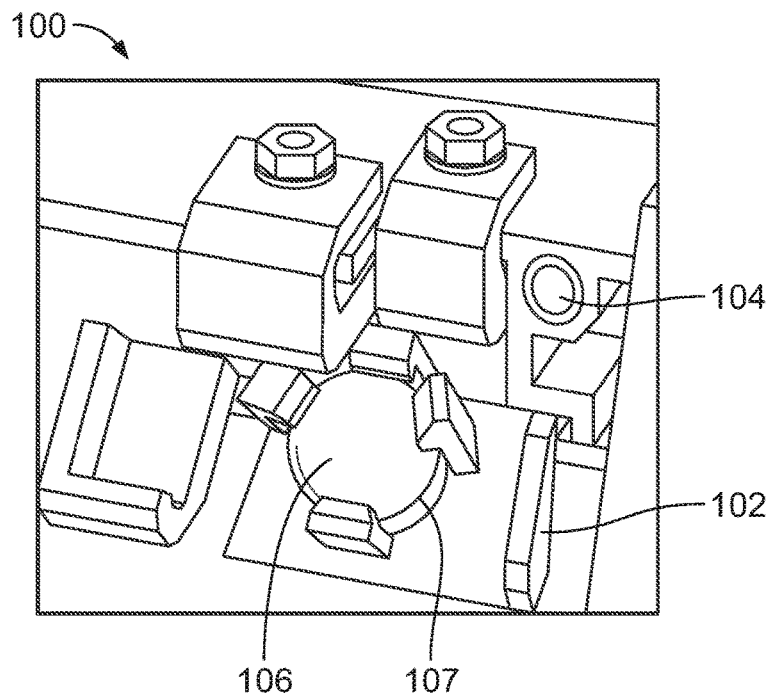
FIG. 7 illustrates a perspective rear view of a handle of a handle assembly in a fully actuated position, according to an embodiment of the present disclosure.

FIG. 7 illustrates a perspective rear view of the handle 102 of the handle assembly 100 in a fully actuated position, according to an embodiment of the present disclosure. As shown in FIG. 7, the spherical member 106 is in the rest position 107, and the handle 102 is in the fully actuated position. In this position, the blocking protuberance 112 (shown in FIGS. 5 and 6) of the housing 104 does not engage the spherical member 106 1 in the rest position.

Figure 8:
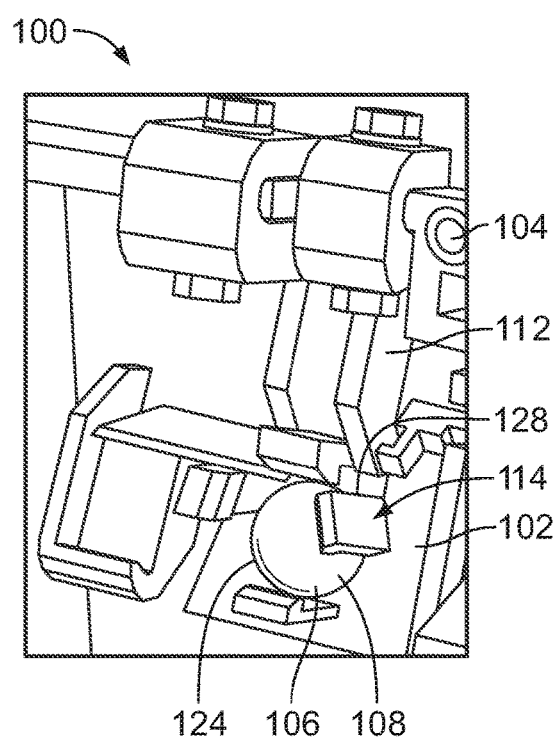
FIG. 8 illustrates a perspective rear view of a handle of a handle assembly in which a spherical member is in a blocking position, according to an embodiment of the present disclosure.

FIG. 8 illustrates a perspective rear view of the handle 102 of the handle assembly 100 in which the spherical member 106 is in the blocking position 108, according to an embodiment of the present disclosure. As shown in FIG. 8, due to an external force, the spherical member 106 is in the blocking position 108, while the handle 102 is at rest. In particular, the spherical member 106 is forced further down (for example, embeds) into the retaining chamber 124 of the retainer 114, which may include and/or be connected to guides 128 (such as beams) of the housing 104. The spherical member 106 moves further down in the retaining chamber 124 into a blocking position by inertial force, for example. As shown, in at least one embodiment, the blocking position 108 is at a lower position with the retaining chamber 124 than the rest position.

Figure 9:
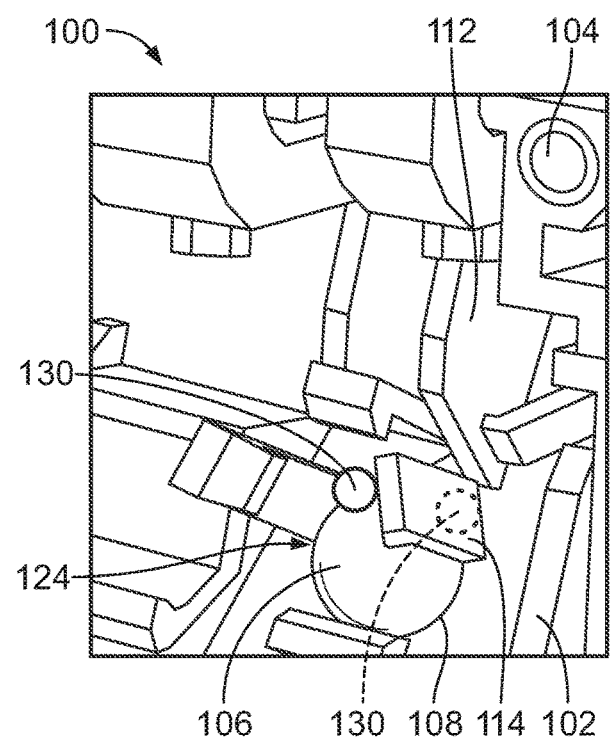
FIG. 9 illustrates a perspective rear view of a handle of a handle assembly in which a spherical member in a blocking position halts motion of the handle, according to an embodiment of the present disclosure.

FIG. 9 illustrates a perspective rear view of the handle 102 of the handle assembly 100 in which the spherical member 106 in the blocking position 108 halts motion of the handle 102, according to an embodiment of the present disclosure. As shown, the blocking position 108 of the spherical member is further down the retaining chamber 124 than the rest position. As shown in FIG. 9, the spherical member 106 is in the blocking position 108, and the handle 102 is stopped from movement due to contact between the blocking protuberance 112 of the housing 104 and the spherical member 106, such as at points 130.

Figure 10:
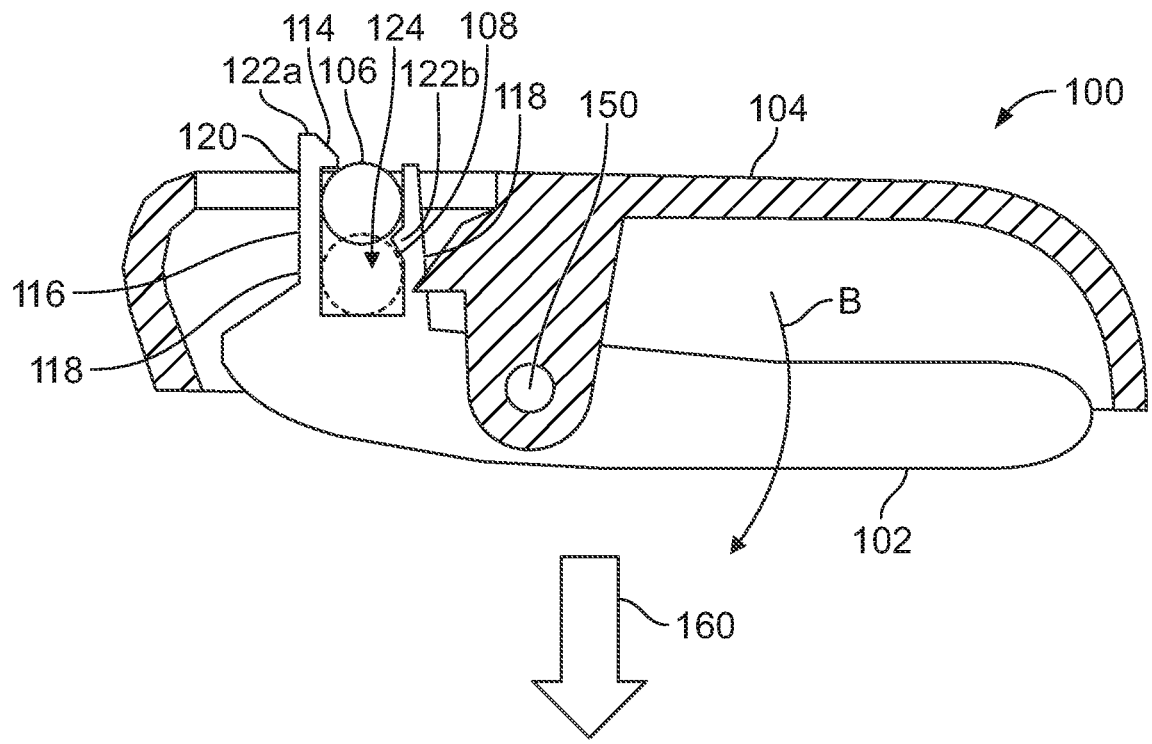
FIG. 10 illustrates an axial cross-sectional view of a door handle assembly with a handle in a rest position, according to an embodiment of the present disclosure.

FIG. 10 illustrates an axial cross-sectional view of the door handle assembly 100 with the handle 102 in the rest position, according to an embodiment of the present disclosure. The spherical member 106 is retained within the retaining chamber 124 of the retainer 114. As shown, the spherical member 106 in the rest position is within a distal location within the retaining chamber 124, such as retained between opposed retaining clips 122 of different prongs 116. For example, the spherical member 106 is retained within the retaining chamber 124 in the distal position between outer retaining clips 122a and inner retaining clips 122b. As shown, wherein the retaining clips 122a and 122b are at different positions along the respective extension beams 118. The handle 102 is configured to be rotated outwardly from the housing 104 about a pivot axle 150 in the direction of arc B.

Figure 11:
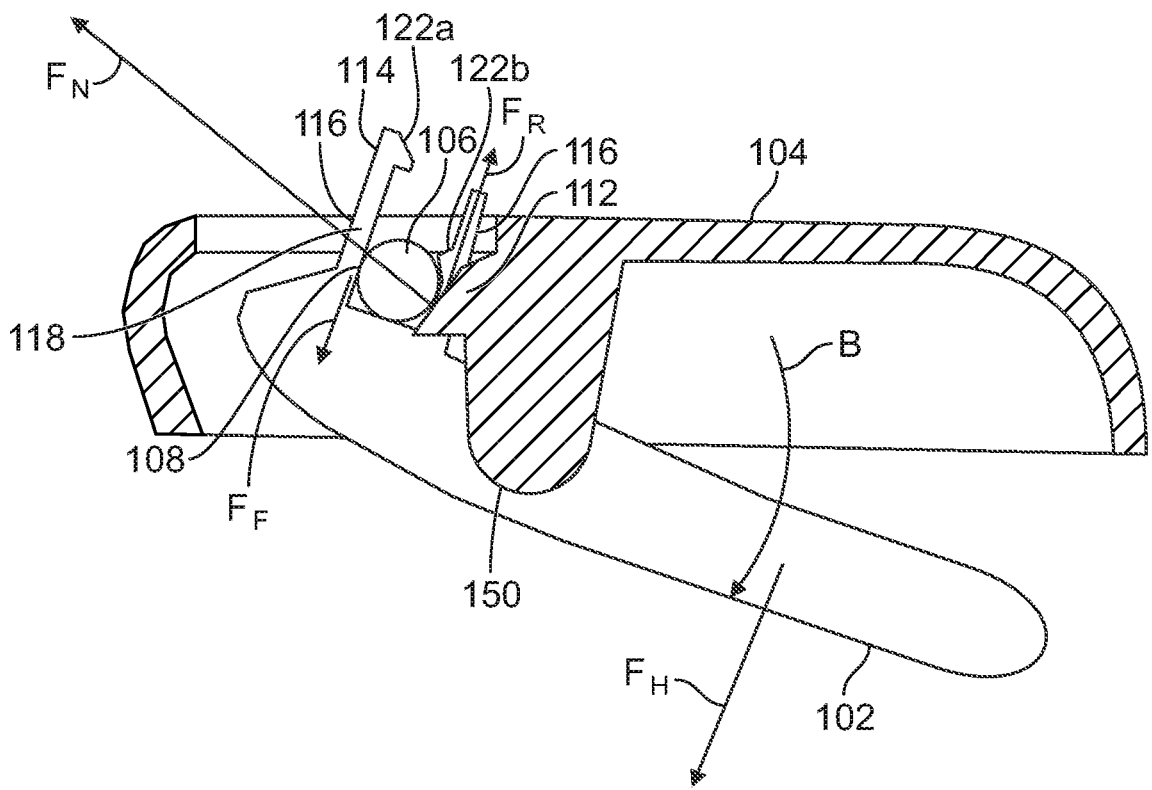
FIG. 11 illustrates an axial cross-sectional view of a door handle assembly with a handle having a spherical member in a blocking position, according to an embodiment of the present disclosure.

FIG. 11 illustrates an axial cross-sectional view of the door handle assembly 100 with the handle 102 having the spherical member 106 in the blocking position 108, according to an embodiment of the present disclosure. As shown in FIG. 11, as a force of a predetermined magnitude is exerted into the handle assembly 100 in the direction of arrow 160 shown in FIG. 10, the spherical member 106 dislodges from engagement between the retaining clips 122a, 122b and is forced downwardly into the retaining chamber 124 from the distal location (shown in FIG. 10) into the blocking position 108, thereby abutting into the blocking protuberance 112 of the housing 104. The prongs 116 of the retainer 114 guide the spherical member 106 between the rest position and the blocking position 108.

The frictional force $F_F$ is that between the prongs 116 and the spherical member 106. The frictional force emerges between the prongs 116 (left side), the spherical member 106, and the blocking protuberance 112. The inertial force that actuates the handle 102 during an impact (such as a crash) is typically less than the $F_H$ to hold back the handle 102.

The force that frees the spherical member 106 from the locking by the snap feature of the handle 102 is the resetting force FR, which is parallel to the guiding features (that is, the extension beams 118 of prongs 116) that retain the spherical member 106. The resetting force $F_R$ is caused by a hand force $F_H$. When the hand force $F_H$ reaches a predetermined magnitude, the spherical member 106 is reset to an initial rest position without damaging the handle assembly 100. For example, as the handle 102 is moved to the resetting position, the blocking protuberance 112 pushes the spherical member 106, such as via a normal contact force $F_N$, back towards the rest position, where the spherical member 106 is then retained between the retaining clips 122a and 122b. In this manner, the handle 102 may be reset. That is, wherein the blocking protuberance 112 forces the spherical member 106 from the blocking position 108 back into the rest position in response to the handle 102 being outwardly pulled, such as away from the housing 104 about the pivot axle 150.

Referring to FIGS. 2-11, contact between the spherical member 106 and the housing 104 (such as the blocking protuberance 112) may or may not be a point contact. For example, the blocking protuberance 122 may be a contiguous surface that contacts a substantial portion of the spherical member 106.

The door handle assembly 100 may also include an energy-absorbing material (such as rubber, foam, or the like) at the contact surface between the spherical member 106 and the blocking protuberance 112). The energy-absorbing material may be used to reduce any rebound of the spherical member 106) when suddenly stopped by the blocking protuberance. Further, kinetic energy of the spherical member 106 is also absorbed by the spherical member 106 moving into a reciprocal retaining structure.

Guiding ribs and snap hooks of the retainer 114 around reduce the amount of material covering the spherical member 106, thereby reducing weight, and reducing areas where ice and dirt may otherwise accumulate. Further, the guiding ribs and snap hooks (such of the prongs 116) may be configured to allow liquid to flow away from any potential contact surface with the spherical member 106. In short, the handle assembly may be configured to drain liquid via an open structural design.

Embodiments of the present disclosure provide a handle assembly that includes a spherical member (such as a metal ball) within a rotatable handle. The spherical member is moveably secured within a retainer of the handle (as opposed to a fixed housing) between a rest position, and a blocking position (that prevents the handle from latching, for example). The handle assembly is configured to be manipulated to reset the ball back to the rest position without causing damage to the handle assembly. In this manner, the handle assembly is resettable between the rest position and the blocking position.

As described herein, embodiments of the present disclosure provide a door handle assembly that is less susceptible to sticking in an extended, blocking position. Further, the door handle assembly may be easily returned to an at-rest position, even after a substantial impact event. Moreover, the door handle assembly is configured to return to an at-rest position after being subjected to a substantial external force.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A door handle assembly for a door of a vehicle, the door handle assembly comprising:
   a housing that is configured to form part of or otherwise connect to the door, the housing comprising a blocking protuberance;
   a handle moveably coupled to the housing, wherein the handle is configured to move between a latched position and an unlatched position by rotating relative to the housing; and
   a spherical member coupled to the handle within a retaining chamber within a portion of the handle, wherein the spherical member is configured to move within the retaining chamber between a rest position and a blocking position, wherein, when in the blocking position, the spherical member prevents the handle from moving to the latched position by engaging the blocking protuberance of the housing, and wherein, when in the rest position, the spherical member is retained within the retaining chamber wherein, during an acceleration of the spherical member from the rest position to the blocking position, the spherical member abuts against the blocking protuberance to halt motion of the handle relative to the housin and the blocking rotuberance forces the spherical member from the blocking position back into the rest position in response to the handle being outwardly pulled.

2. The door handle assembly of claim 1, wherein the spherical member is a metal ball.

3. The door handle assembly of claim 1, wherein the handle comprises a retainer that defines the retaining chamber configured for retaining the spherical member,.

4. The door handle assembly of claim 1, wherein the blocking position is at a lower position within the retaining chamber than the rest position.

5. The door handle assembly of claim 3, wherein the retainer comprises a plurality of prongs that extend from the handle to define the retaining chamber therebetween.

6. The door handle assembly of claim 5, wherein each of the plurality of prongs comprises an extension beam and a retaining clip.

7. The door handle assembly of claim 6, wherein the retaining clips of at least two of the plurality of prongs are at different positions along the extension beams.

8. The door handle assembly of claim 1, wherein the blocking protuberance forces the spherical member from the blocking position back into the rest position in response to the handle being outwardly pulled.

9. A door handle assembly for a door of a vehicle, the door handle assembly comprising:
   a housing that is configured to form part of or otherwise connect to the door, the housing comprising a blocking protuberance;
   a handle moveably coupled to the housing;
   a spherical member that is configured to move between a rest position and a blocking position, wherein the spherical member is a metal ball; and
   a retainer that retains the spherical member, the retaining member is within a portion of the handle, wherein the retainer comprises a retaining chamber, wherein the spherical member is configured to move within the retaining chamber between the rest position and the blocking position, wherein the spherical member abuts against the blocking protuberance in the blocking position to prevent motion of the handle relative to the housing, and wherein, when in the rest position, the spherical member is retained within the retaining chamber
   wherein, during an acceleration of the spherical member from the rest position to the blocking position, the spherical member abuts a ainst the blocking protuberance to halt motion of the handle relative to the housing, and the blocking protuberance forces the spherical member from the blocking position back into the rest position in response to the handle being outwardly pulled.

10. The door handle assembly of claim 9, wherein the blocking position is at a lower position within the retaining chamber than the rest position.

11. The door handle assembly of claim 9, wherein the retainer comprises a plurality of prongs that extend from the handle to define the retaining chamber therebetween.

12. The door handle assembly of claim 11, wherein each of the plurality of prongs comprises an extension beam and a retaining clip.

13. The door handle assembly of claim 12, wherein the retaining clips of at least two of the plurality of prongs are at different positions along the extension beams.

14. The door handle assembly of claim 11, wherein the blocking protuberance forces the spherical member from the blocking position back into the rest position in response to the handle being outwardly pulled.

15. A door handle assembly for a door of a vehicle, the door handle assembly comprising:
- a housing that is configured to form part of or otherwise connect to the door, wherein the housing comprises a blocking protuberance; and
- a handle moveably coupled to the housing, wherein the handle is configured to move between a latched position and an unlatched position relative to the housing, and wherein the handle comprises:
  - a spherical member that is configured to move between a rest position and a blocking position, wherein the spherical member is a metal ball, wherein the spherical member in the blocking position abuts against the blocking protuberance to halt motion of the handle relative to the housing, wherein the blocking protuberance forces the spherical member from the blocking position back into the rest position in response to the handle being outwardly pulled; and
  - a retainer that comprises a plurality of prongs that extend from a base of the handle to define a retaining chamber for retaining the spherical member, wherein the spherical member is configured to move within the retaining chamber between the rest position and the blocking position, wherein the spherical member prevents the handle from latching when in the blocking position by engaging the blocking protuberance of the housing, wherein each of the plurality of prongs comprises an extension beam and a retaining clip, and wherein the retaining clips of at least two of the plurality of prongs are at different positions along the extension beams.

16. The door handle assembly of claim 1, wherein the blocking protuberance is a rib that extends from the housing toward the handle.

17. The door handle assembly of claim 1, wherein, in the rest position, the spherical member is disposed proximate a distal location of the retaining chamber, and wherein, in the blocking position, the spherical member is disposed away from the distal location of the retaining chamber.

18. The door handle assembly of claim 9, wherein the blocking protuberance is a rib that extends from the housing toward the handle.

19. The door handle assembly of claim 9, wherein, in the rest position, the spherical member is disposed proximate a distal location of the retaining chamber, and wherein, in the blocking position, the spherical member is disposed away from the distal location of the retaining chamber.

20. The door handle assembly of claim 15, wherein, in the rest position, the spherical member is disposed proximate a distal location of the retaining chamber, and wherein, in the blocking position, the spherical member is disposed away from the distal location of the retaining chamber.

* * * * *